United States Patent [19]

Snyder

[11] Patent Number: 5,673,508
[45] Date of Patent: Oct. 7, 1997

[54] BEADED FISHING LURE

[75] Inventor: Gary Snyder, Dodge Center, Minn.

[73] Assignee: Alpha Omega Tackle Corp., Apple Valley, Minn.

[21] Appl. No.: 417,971

[22] Filed: Apr. 6, 1995

[51] Int. Cl.[6] .......................... A01K 85/00; A01K 83/00
[52] U.S. Cl. .................. 43/42.37; 43/44.8; 43/44.82
[58] Field of Search ..................... 43/42.37, 43.16, 43/44.82, 42.38, 42.39, 44.8

[56] References Cited

U.S. PATENT DOCUMENTS

| | | | |
|---|---|---|---|
| 890,549 | 6/1908 | Zamel | 43/42.37 |
| 2,575,248 | 11/1951 | Clark | 43/42.37 |
| 3,079,723 | 3/1963 | Roes | 43/42.37 |
| 4,750,291 | 6/1988 | Chilton | 43/44.82 |
| 4,790,101 | 12/1988 | Craddock | 43/42.37 |
| 5,038,513 | 8/1991 | Hardin | 43/44.8 |
| 5,105,575 | 4/1992 | Robertaccio | 43/44.8 |
| 5,117,575 | 6/1992 | Desmond | 43/44.8 |
| 5,230,178 | 7/1993 | Dillard | 43/44.8 |
| 5,245,783 | 9/1993 | Cumisky | 43/42.37 |
| 5,339,559 | 8/1994 | Strobbe | 43/44.8 |
| 5,386,658 | 2/1995 | Ferguson | 43/42.37 |

OTHER PUBLICATIONS

Cabela's 1996 Catalog. p. 34. Spin'N Jig Lure.

*Primary Examiner*—Kurt Rowan
*Attorney, Agent, or Firm*—D. L. Tschida

[57] ABSTRACT

A jigging lure having a weighted body molded to a fish hook and including a beaded trailer hook. A flapper piece oscillates with lure movement about a projecting extension of the hook shank to strike the body and produce audible sound. The flapper is secured to the body with a split ring at aligned apertures and from a slot which mounts about the hook extension. The eye of the trailer hook is secured to the shank of the primary hook and a bead is molded to the trailer hook. A variety of dressings mount to the bead including multifilament skirts and molded plastic tails.

6 Claims, 14 Drawing Sheets

BEADED FISHING LURE

BACKGROUND OF THE INVENTION

The present invention relates to fishing lures and, in particular, to a jig type lure capable of creating audible sounds and to a fish hook useable with or without a lure having a plastic bead bonded to the hook shank and from which a further dressing piece extends.

With a growing awareness of the significance of audible sounds to various fish species, numerous fishing lures have been developed to include sound producing properties. The majority of such lures provide a hollow chamber that supports one or more weighted beads which are free to move within the chamber. The chambers are frequently found in "crankbait" lures which have relatively large plastic bodies. Alternatively, "rattle" chambers are constructed as accessory pieces to be separately attached to an existing lure. Examples of the foregoing crankbait lures and accessory rattle chambers can be found at tackle dealer displays, fishing catalogs etc..

Of the accessory rattle chambers frequently found with jig type fishing lures, most typically, the chambers are attached to the body of the lure with a compatible fastener. The chambers are formed as hollow plastic, glass, or metal containers which support a number of rattle pieces. The chambers may also be molded into the weighted body of a lure.

A number of flat or stamped metal crankbait lures also exist which include metal body portions or flappers that are secured to the body so they are free to move and strike the body during lure retrieval. The flappers are typically restrained to a pivot fastener or a ring.

Some ice fishing lures provide a body having plastic flappers attached to a hook eye. The flappers move with normal jigging to visually enhance lure presentation. The lure body is cast from lead and consequently the plastic flappers do not create any particularly significant sound.

A variety of skirts and other multi-filament dressings have also been developed which mount to the body of a fish lure or hook to obscure a trailing hook. A collar at the skirt is typically threaded to the hook shank or an appendage at the lure body. The shank of the hook otherwise is not constructed to support appended dressings, except those which might be mounted over the barb.

In contrast, to the foregoing known lures, the subject invention provides an audible, jig type lure which can be used alone or in combination with a trailer hook having an attractor dressing molded to the hook. The lure and trailer hook may be used alone or together. When used together, the produced sound and the free moving trailer hook entice a targeted sport fish species.

SUMMARY OF THE INVENTION

It is accordingly a primary object of the invention to provide a jig type fishing lure having a capability of producing audible sounds.

It is a further object of the invention to provide a fish hook that contains an attractor dressing bonded to the hook shank and which is useable alone or in combination with the audible lure.

It is a further object of the invention to provide a lure including a moveable member or flapper which oscillates relative to an up turned hook eye to create sound.

It is a further object of the invention to provide a flapper which is secured at a split ring to the fore end of the lure and at a slot to an up turned eye.

It is a further object of the invention to provide a trailer hook which mounts to the primary hook shank and which trailer hook includes a plastic bead bonded to the shank of the trailer hook.

It is a further object of the invention to provide a treble trailer hook having a plastic bead sonically bonded to a juncture between multiple shanks of the hook and from which a filamentary skirt trails.

It is a further object of the invention to provide a bead at the trailer hook which includes a flanged appendage to which further trailer dressings can be attached.

Various of the foregoing objects and advantages are particularly obtained in a presently preferred fish lure which includes a body molded about a hook having an up turned eye. A flapper piece having a forward mounting aperture is retained to an aligned aperture at the lure body with a split ring. A displaced slot mounts over the up turned hook eye. A fish line mounts to the eye. The flapper is aerodynamically shaped to oscillate up and down along a portion of the shank at the eye during lure retrieval as water passes between the body and underside of the flapper. An attractor dressing may be mounted to the primary hook shank.

A preferred dressing is a trailer hook which is mounted over the primary hook barb and is free to move with lure motion. The trailer hook includes a bead which is bonded to the shank of the trailer hook in non-interfering relation to the hook barb. A filamentary skirt can be retained to the bead. A flanged appendage at the bead may also contain a further plastic trailer dressing. The trailer hook, which may include multiple barb segments, may also be used independent of the audible lure.

Still other objects, advantages and distinctions of the invention will become more apparent from the following description with respect to the appended drawings. To the extent various modifications and improvements have been considered, they are described as appropriate. The description should not be strictly construed in limitation of the invention. Rather, the invention should be interpreted within the scope of the further appended claims.

DESCRIPTION OF THE PREFERRED EMBODIMENT

Figure 3:
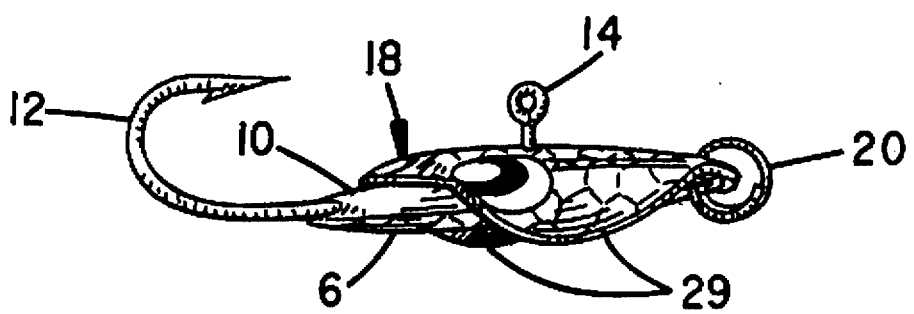
FIG. 3 is a side elevation view with the flapper member lowered against the body.
Figure 4:
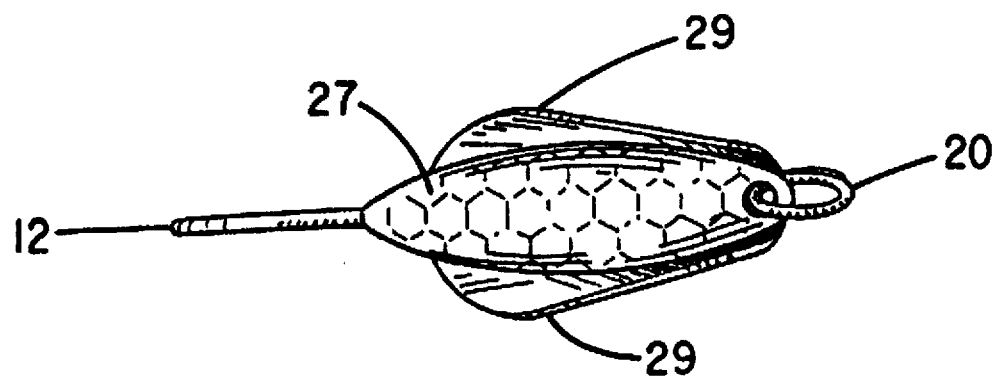
FIG. 4 is a bottom view of the lure.
Figure 5:
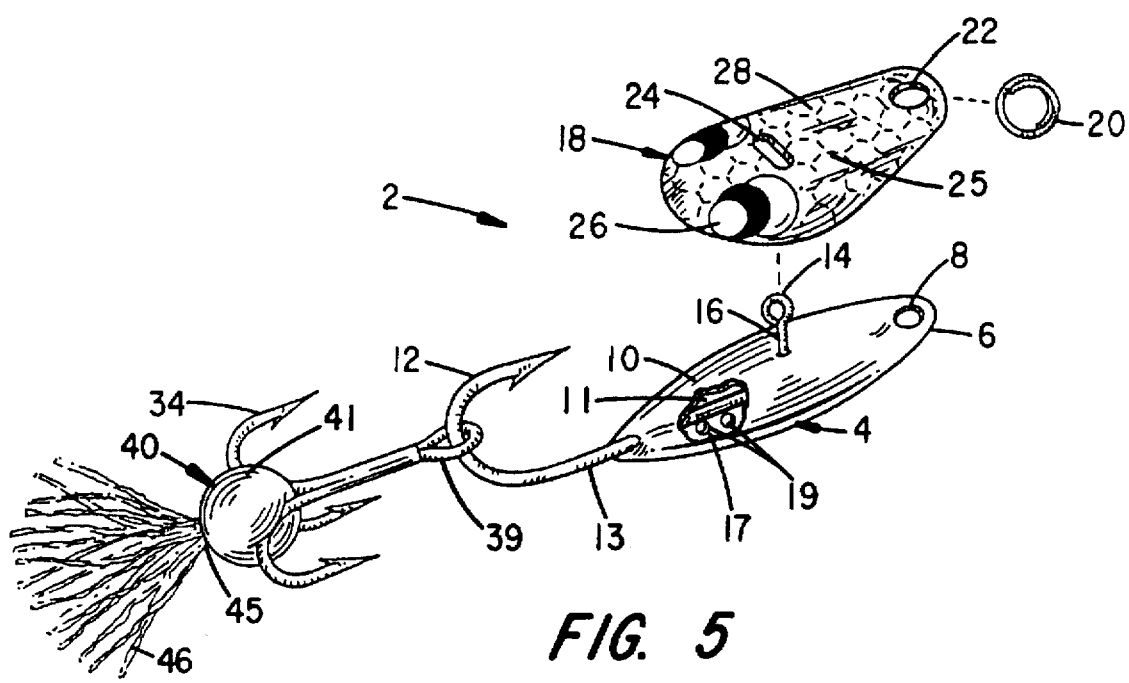
FIG. 5 is an exploded assembly drawing of the lure with an attached trailer hook and wherein modifications to the lure body are shown in cutaway.

Turning attention to FIGS. 1–5, a number of views are shown to the audible fishing lure 2 of the invention. FIGS. 1–4 depict various views of the lure 2 as it appears in normal use. FIG. 5 depicts an exploded assembly drawing to the construction of the lure 2 and an attached trailer hook 40.

The lure 2 includes a weighted body 4 which is molded to a fish hook 12. The body 4 is configured of a metal shell 6 having an aperture 8 formed at a forward end. A hook bonding material or filler 10 is cast into a concave region 11 of the shell 6 to fill the concavity 11 and cover a portion of the hook 12 positioned within the concavity 11. The shank 13 of the hook 12 includes a line attachment eye 14 at the end of an orthogonally bent extension 16.

A lead filler 10 is preferably cast about the hook shank 13 at the juncture to the extension 16. Lead provides suitable weight to the lure 2 and readily flows about the hook 12 and bonds to the shell 6. A variety of other filler materials having differing buoyancies, molding characteristics and other desired characteristics may also be used. Alternatively, the hook 12 can be separately bonded to the shell 6 in a separate welding operation without providing for a filler 10.

The shell 6 is presently constructed to an elliptical shape with a recessed concavity 11. A variety of other shapes may alternatively be used at the body 4. The shape should be selected to facilitate a preferred movement of the lure 2 during retrieval.

The shell 6 may also be constructed of a variety of materials, although a metal shell 6 is presently preferred. The shell 6 is formed and cut to shape in a single stamping operation. The exposed surfaces of the shell 6 and filler 10 can be provided with a suitable stamped pattern or be anodized or painted.

Secured to the aperture 8 is a moveable body piece or flapper 18. The flapper 18 is retained to the aperture 8 with a split ring fastener 20 which fastens through the aperture 8 and to an aperture 22 at the flapper 18. A slotted or elongated aperture 24 separately mounts about the hook shank extension 16. The size and shape of the slot 24 is cut to permit free movement of the flapper 18 about the extension 16. The extension 16 projects above the filler material 10 a distance sufficient to facilitate movement of the aft end of the flapper 18. The split ring 20 is selected to permit free movement of the fore end of the flapper 18.

Figure 1:
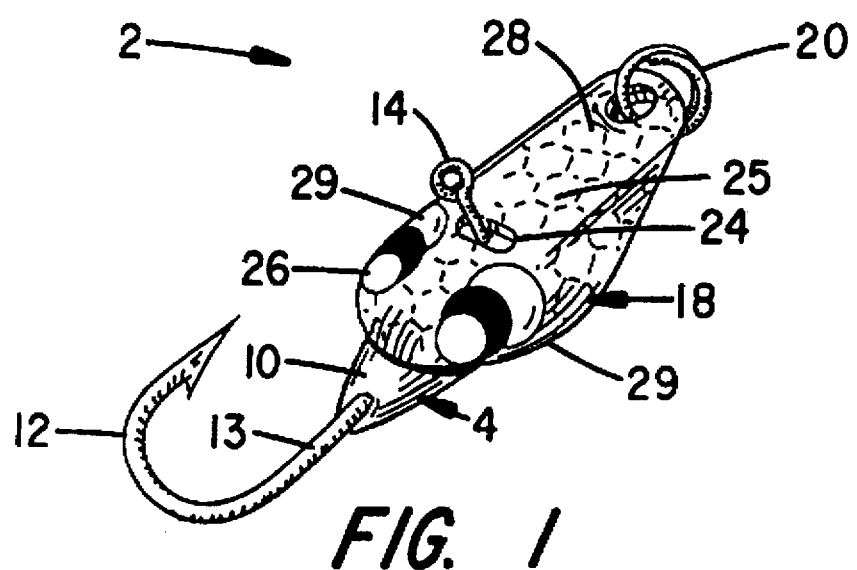
FIG. 1 is a perspective drawing showing a top view of the audible lure of the invention.
Figure 2:
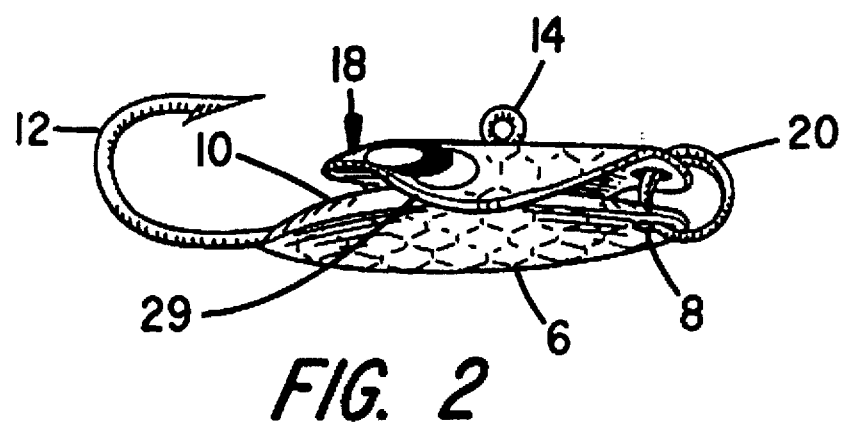
FIG. 2 is a left side elevation view of the lure with the flapper member partially raised.

During normal lure retrieval, with the line affixed to the eye 14, water is free to flow between the flapper 18 and body 4, reference FIGS. 2 and 3, to cause the flapper 18 to oscillate up and down and move side-to-side. The flapper 18 is constructed of a stamped metal. Movement of the flapper 18 in relation to the body 4 therefore creates audible sounds which are detectable by a fish. During normal retrieval, the lure 2 is jigged with short erratic jerking movements at a fishing rod to accentuate the movement of the flapper 18 and increase the amount of obtained sound. The amount of sound obtained will also depend upon the size of the lure.

With additional attention to FIG. 5 and although a solid body 4 is presently preferred, it is to be appreciated the body 4 might include a hollow cavity 17 and wherein a number of beads or rattle pieces 19 might be contained. Sounds produced as the flapper 18 strikes the cavity 17 would be exaggerated with the presence of the cavity 17, much the same as with a drum. The produced sound would be augmented with the additional presence of beads 19 to strike the walls of the shell 6.

With attention to FIGS. 2–4, the flapper 18 includes lateral wings 29 which depend from a central portion 25 that contains the slot 24. The wings 29 are shaped to impinge on the water during retrieval to facilitate movement of the flapper 18. Without the wings 29, a potential exists the flapper 18 might be prevented from striking the body 4.

The flapper 18 includes painted surface ornamentation 26 and a patterned dimpling or scaling 28. The scaling 28 can be formed into the metal or be painted onto the flapper 18. A similar patterned scaling 28 is also provided at the exposed lower surface 27 of the shell 6, reference FIG. 4.

Figure 6:
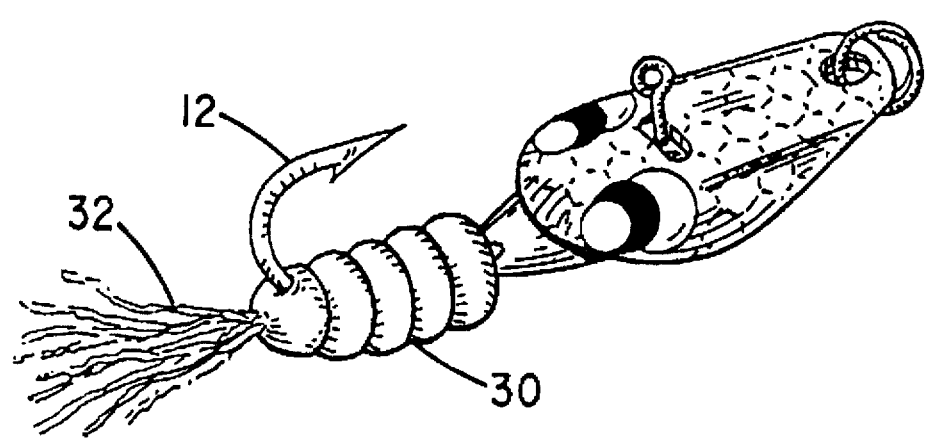
FIG. 6 is a perspective drawing of the lure including an appended plastic dressing.

FIGS. 5–8 also depict the lure 2 with a number of dressings supported to the hook 12 to augment the painted ornamentation 26 and patterned scales 28. FIG. 6 depicts a plastic, grub-like body 30 which is threaded to the shank 13. The body 30 can be constructed to a variety of shapes and can be molded from a variety of materials, e.g. plastisol.

A filamentary skirt 32 trails from the grub body 30. The skirt 32 can be molded or embedded into the body 30 or may be used independently of the body 30. In the latter instance a fastener, such as an elastic band or collar, can bind the skirt 32 to the lure 2.

Figure 7:
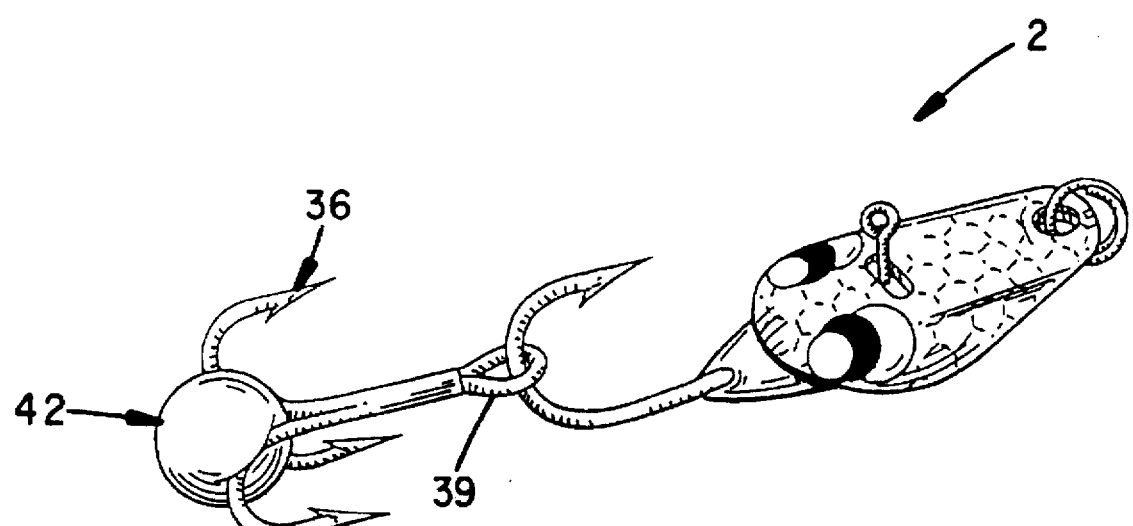
FIG. 7 is a perspective drawing of the lure including a skirtless, beaded trailer hook.
Figure 8:
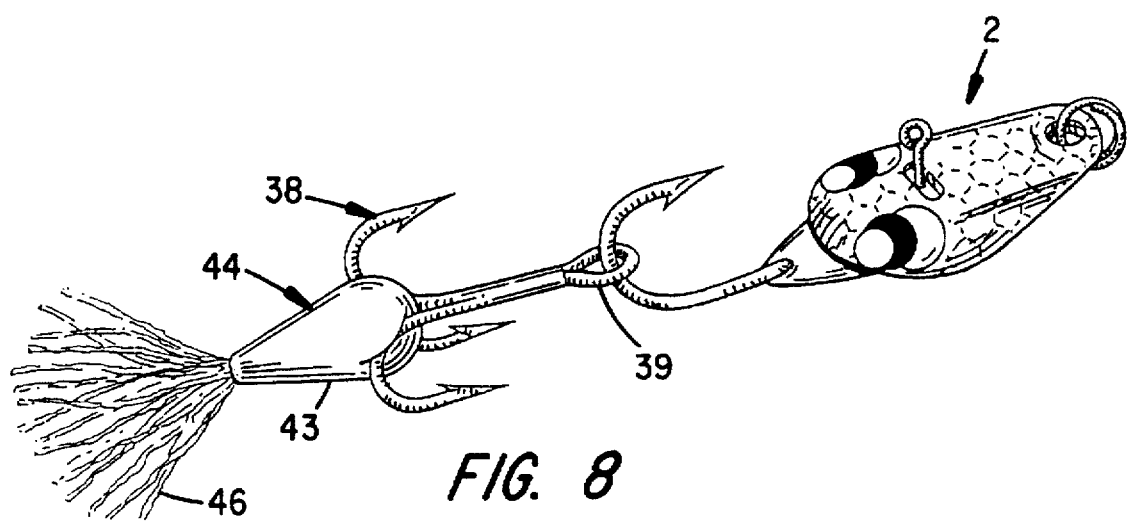
FIG. 8 is a perspective drawing of the lure including a tear drop shaped beaded trailer hook.

FIGS. 5, 7 and 8 depict trebled trailer hook dressings 34, 36 and 38 which are attached to the hook 12. An eye 39 of each of the trailer hooks 34, 36 and 38 is fitted about the shank 13 of the hook 12 and is free to move to and fro with lure movement. Each of the hooks 34, 36 and 38 is configured from a treble hook, however, single or double hook configurations may also be used.

The separation between the barbs of the hooks 12 and 34, 36 and 38 can be varied by either extending the shank of the hooks 34, 36 and 38 or by coupling an intermediate connector between the hooks. For example, a short length of fish line or leader material can be affixed between the barbed end of the hook 12 and the eye 39 of each hook 34, 36 or 38.

Figure 9:
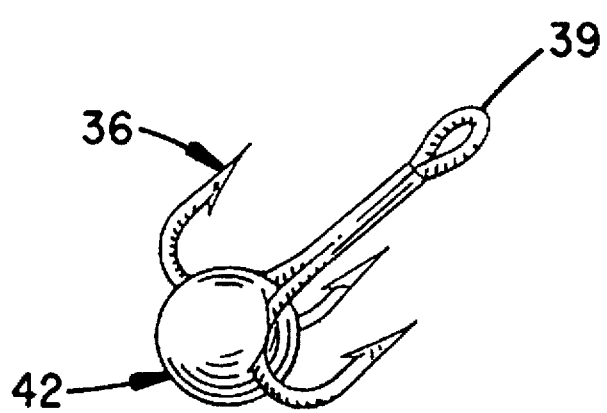
FIG. 9 is a perspective drawing of a skirtless, beaded, treble trailer hook.
Figure 10:
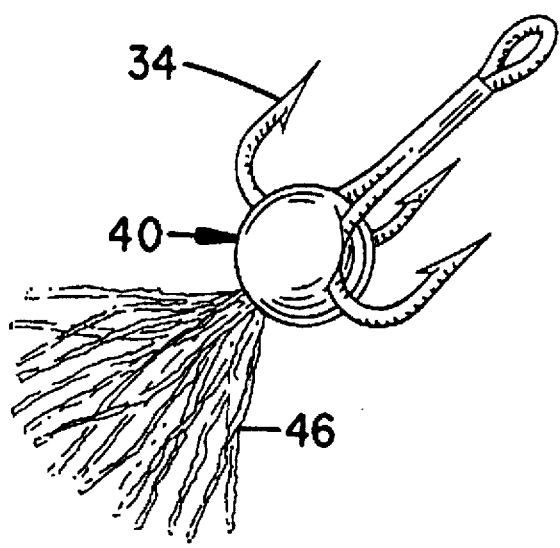
FIG. 10 is a perspective drawing of a beaded, treble trailer hook including an integral skirt.
Figure 11:
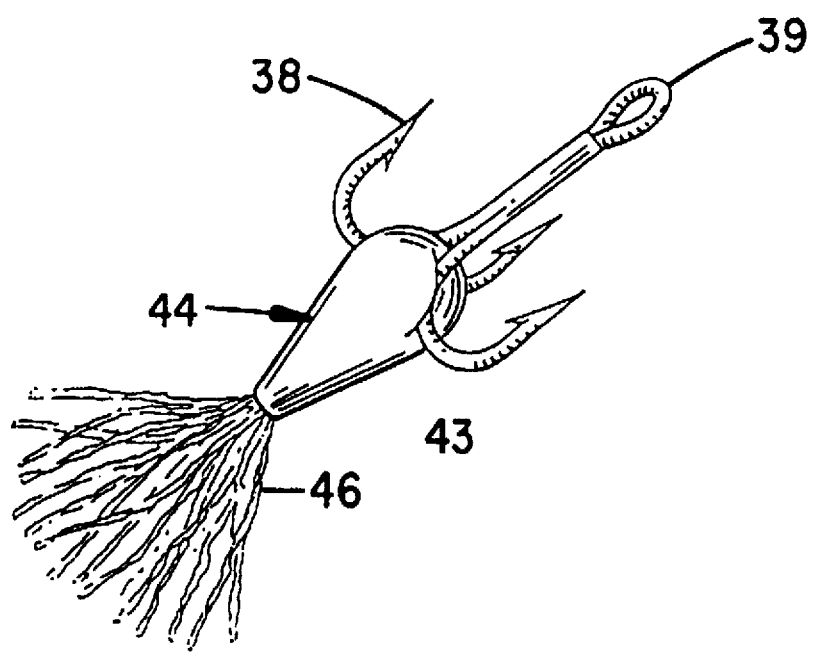
FIG. 11 is a perspective drawing of a beaded, treble trailer hook including a skirted, tear drop shaped bead.

Each of the trailer hooks 34, 36 and 38, which are also shown detached from the lure 2 at FIGS. 9, 10 and 11, are constructed from a conventional treble hook and to which plastic dressings 40, 42 and 44 are respectively added. The dressing 40 consists of a solid spherical plastic bead 41 which is sonically bonded to the hook 34 at the juncture between each of the barbed ends.

Bonding is achieved upon compressing the bead 41 to the shank of the hook 34 while vibrating the hook 34. The plastic bead 41 melts and flows about the hook shank and a durable and substantially permanent bond is achieved between the bead 41 and hook 34. The bond has particularly proven sufficient to withstand the rigors of normal fishing and the stress placed on the hook 34 when playing a hooked fish. The bead 41 can be configured to a variety of shapes and may include appended ornamentation or a variety of dressings.

A filamentary skirt 46 is mounted to depend from a hole 45 at the aft end of the bead 41. The skirt 46 can be formed from a variety of rubber, plastic, metal or laminated materials, cut to proved a number of fibrous strands. The skirt 46 is retained to the bead 41 with an appropriate adhesive. Depending upon the skirt and dressing type, a variety of fasteners can be used to advantage.

The hooks 36 and 38 depict two alternative constructions of trailer dressings 42 and 44. The hook 36 provides a single plastic bead 40 having no skirt. The dressing 44 provides a tear dropped shaped bead 43 and from which a skirt 46 depends.

Figure 12:
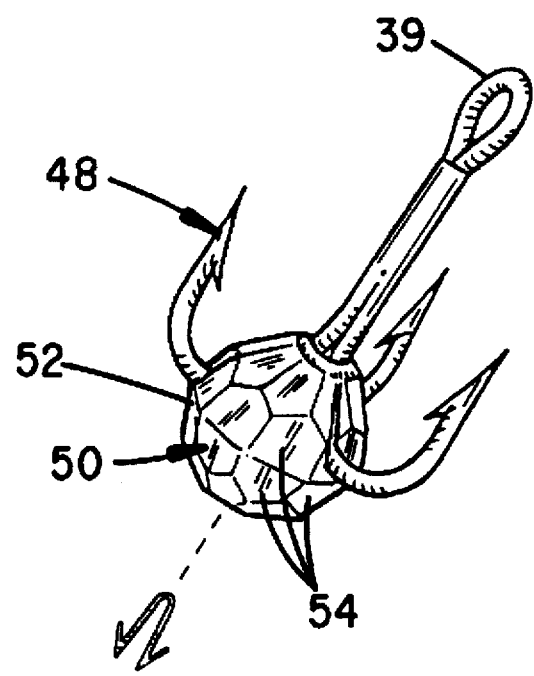
FIG. 12 is a perspective drawing of a beaded, treble trailer hook including a multi-faceted bead.

FIG. 12 depicts a trailer hook 48 having a multifaceted dressing 50. The dressing 50 particularly comprises a plastic bead 52 having a number of flat facets 54 formed into the outer surface of the bead 52. The facets reflect light and produce a sparkling effect to further entice a prey fish. A skirt can also be added to the bead 52 as desired.

While the trailer hooks 34, 36, 38 and 48 and attached dressings have been shown in relation to the lure 2, it is to be appreciated that the hooks 34, 36, 38 and 48 can be used independent of the lure 2. The hooks 34, 36, 38 and 48 may also be added to a variety of conventional lures either as a trailer hook or as replacements for provided hooks at the commercial lure.

Figure 13:
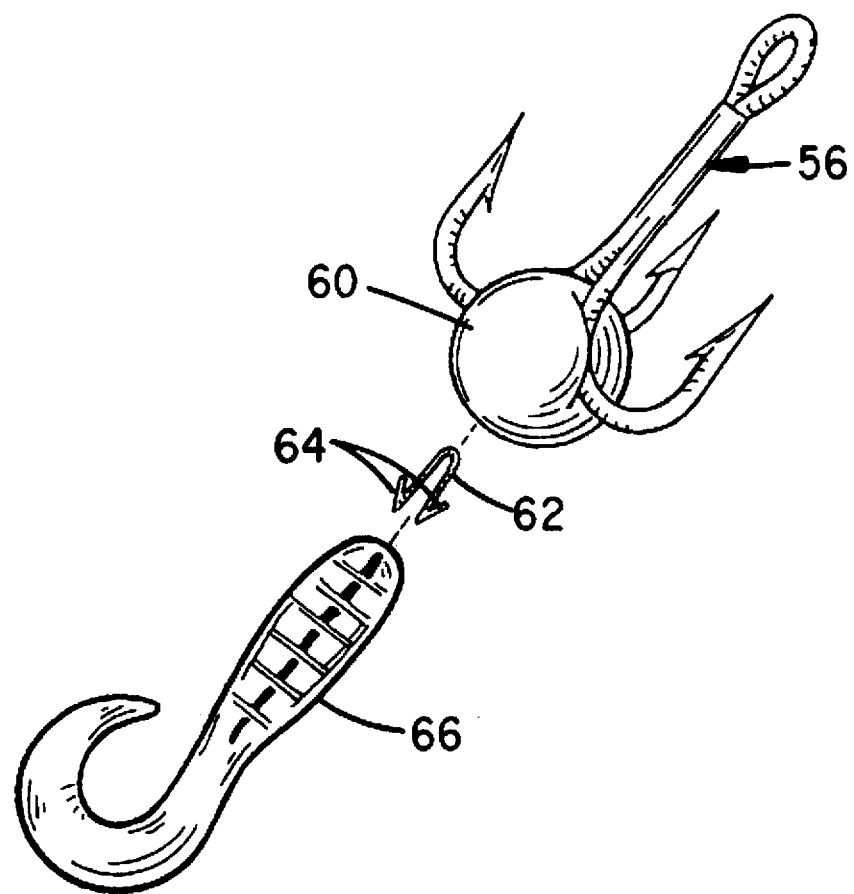
FIG. 13 is a perspective drawing shown in exploded assembly of a beaded, treble trailer hook including a split flanged appendage to which a plastic lure dressing is appended.
Figure 14:
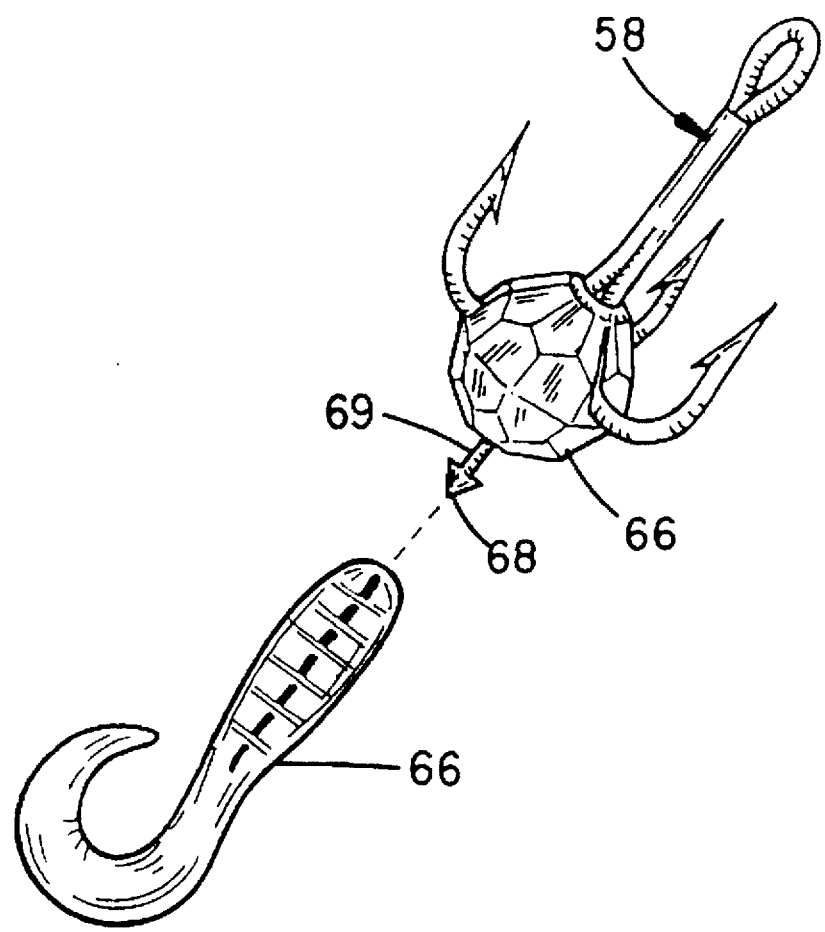
FIG. 14 is a perspective drawing shown of a beaded, treble trailer hook including a solid flanged appendage to which a plastic lure dressing is appended.

FIGS. 13 and 14 depict still other trailer hook constructions 56 and 58. The hook 56 includes a spherical plastic bead 60 and from which a resilient barbed flange 62 extends. The flange 62 can be constructed of metal or plastic and provides a pair of arms 64. Each arm includes a barb 64. Upon piercing a grub tail 66 with the flange 62 the barbs 64 retain the tail 66 to the bead 60.

The trailer hook 58 of FIG. 14 provides a multi-faceted bead 66 and from which a conical flange 68 projects. A single conical barb projects from the flange 68. It is to be appreciated however that multiple projections can be formed to extend from the shank 69 to facilitate retention of an appended grub tail 66.

While the invention has been described with respect to a number of presently preferred constructions and various considered modifications and improvements, it is to be appreciated still other constructions may suggest themselves to others skilled in the art. The appended claims should therefore be construed to include all those equivalent embodiments within the spirit and scope thereof.

What is claimed is:

1. A fishing lure comprising a treble hook having three barbed ends, an eye, and a shank, wherein a plastic bead is sonically bonded to a common juncture of the barbed ends, whereby portions of the bead are melted about said common juncture and immovably restrain the bead to the hook without obstructing the barbed ends.

2. A fishing lure as set forth in claim 1 wherein a filamentary skirt projects from a bore of said bead coaxial with said shank.

3. A fishing lure as set forth in claim 1 wherein said bead includes a plurality of intersecting planar facets.

4. A fishing lure comprising a hook having an eye, a shank, and a plurality of barbs, which barbs transversely radiate from a common juncture at said shank, wherein a plastic bead is sonically bonded to the common juncture, whereby portions of the bead melt and flow about said hook to immovably restrain the bead to said hook, and wherein a flanged member projects from said bead and a filamentary dressing is fitted to said flanged member.

5. A fishing lure comprising a hook having an eye, a shank, and a plurality of barbs, which barbs transversely radiate from a common juncture at said shank, wherein a plastic bead having a bore is sonically bonded to the common juncture, whereby portions of the bead are melted about said hook to immovably restrain the bead to said barb, and wherein a flanged member projects from said bore and a filamentary dressing is mounted to said flanged member.

6. A fishing lure as set forth in claim 5 wherein said flanged member includes first and second barbed arms.

* * * * *